United States Patent

[11] 3,590,323

| [72] | Inventors | Neville Mapham<br>Rochester;<br>James H. Galloway, New Baltimore, both of, Mich. |
|---|---|---|
| [21] | Appl. No | 5,069 |
| [22] | Filed | Jan. 22, 1970 |
| [45] | Patented | June 29, 1971 |
| [73] | Assignee | Udylite Corporation<br>Warren, Mich. |

[54] PEAK CURRENT LIMITING SYSTEM
20 Claims, 4 Drawing Figs.

[52] U.S. Cl............................................ 317/22,
 317/31, 317/33, 317/36, 321/14, 323/9
[51] Int. Cl......................................................... H02h 7/14
[50] Field of Search............................................ 317/22, 31,
 33, 36; 321/14, 13; 323/9

[56] References Cited
UNITED STATES PATENTS

| 3,363,143 | 1/1968 | Cavanaugh.................. | 317/22 X |
| 3,374,420 | 3/1968 | Weber, Jr..................... | 321/14 X |
| 3,466,527 | 9/1969 | Chun........................... | 321/14 |

Primary Examiner—J. D. Miller
Assistant Examiner—Harry E. Moose, Jr.
Attorneys—Stanley H. Lieberstein and William J. Schramm ABSTRACT: A very fast acting peak current limiting system for the protection of semiconductor controlled rectifiers or thyristors and associated circuit components against damaging overloads resulting from short circuits. In a rectifier power supply system the input current of which is controlled by semiconductor controlled rectifiers, peak current is sensed on each incoming power line and compared with a preset reference. In event the peak current exceeds the reference, an error signal is generated which actuates a trigger circuit connected to the gate lead of the semiconductor controlled rectifiers to phase back these rectifiers to the nonconductive mode. The rectifiers are then slowly returned to the current threshold. If the overload was caused by a transient condition, normal current will flow. If the overload was due to a persistent condition, the slow return of the semiconductor rectifiers to an overload condition will permit supplementary control systems having a slower time response to control the current into the rectifiers. Such supplementary control system may comprise subsystems to control overloads due to either internal faults within the power supply system or external faults.

3,590,323

PEAK CURRENT LIMITING SYSTEM

SUMMARY AND BACKGROUND OF THE INVENTION

This invention relates to a system for protecting semiconductor controlled rectifiers against current overloads, and more particularly for protecting semiconductor controlled rectifiers employed in a power supply system against damaging excessive current overload conditions caused by short circuits both internal or external to the power supply system.

Semiconductor controlled rectifiers (hereinafter denoted by the abbreviation SCR's) have come into widespread use in power supply systems, and in particular rectifier power supply systems in which an alternating current input is converted to direct current output. In such systems, extensive use is made of that type of SCR known as the silicon controlled rectifier.

In certain applications, and particularly in the industrial process field, high capacity or "stiff" power supply systems are frequently required. Such systems unfortunately have extremely high available fault currents. Adequate survival capability in such a stiff system is essential since the heating and magnetic stresses in the linear circuit elements correspond to the square of the current. Therefore, SCR's, diodes, as well as the associated circuit components, and bus work must be safeguarded against overload current conditions producing such excessive current conditions.

One solution to the problem is to design the system to be able to endure the grossest overload from fault conditions on a steady state basis. However, such a design expedient requires the provision of SCR's and other system components which will withstand an overload a sizable number of times higher than normal working load. While such a system is technically feasible, it is not practical as the cost of such highly rated SCR's and components is such as to present a negative economic factor.

The alternative is to provide an overcurrent protective system. This latter approach is particularly desirable in the case of rectifier power supply systems employing SCR's or diodes or both. Among the functions of such a system are the limitation of the duration and magnitude of internal and fault currents. An internal fault is defined as a fault within a rectifier power supply system having an alternating current input and a direct current output. Examples of such internal faults are a failed SCR or diode which fails by shorting rather than opening, a transformer failure, or a short circuit on the internal bus work. An external fault is defined as a fault outside the rectifier power supply system and within the system to which direct current power is fed. An example is a short circuit on the external direct current bus work caused by a conductive foreign object falling thereon.

In the past, circuit breakers and current limiting fuses have been used as protective devices in stiff power supplies. However, despite their recognized reliability, circuit breakers will not function quickly enough to protect SCR's and their associated components against damage or destruction due to the very rapid rise of current caused by faults. Circuit breakers have time responses of more than one cycle, and the thermal overload capacity of SCR's require their shutdown with a period of time not in excess of one-half of one cycle when employed in "stiff" systems. While current limiting fuses are both reliable and effective protective devices due to their very fast melting characteristics, they are limited in their application to systems of lower current supply capabilities than the maximum rated capacity of the SCR's. Such capability must be below the current carrying rating of the SCR's since arcing takes place after melting and the peak let-through current may be expected during the arcing phase in a stiff system. For this reason, SCR's in fuse protected circuits should be operated below their maximum ratings to present a safety factor, and the full capability of the system cannot be used with acceptable reliability. Moreover, spare fuses must be kept on hand to replace burned out fuses, and should the inventory on hand at the power supply system become exhausted, the equipment will remain shutdown until a further supply of fuses is established. In addition, current limiting fuses are quite expensive and, since they are a consumable item, their cumulative cost over an extended period is such that their use may be economically undesirable.

Both of the foregoing protective devices have certain basic disadvantages. First, manual operations are required. In the case of a fuse, the burned out fuse must be removed and a fresh one inserted. In the case of a circuit breaker, it must be reset manually. Second, both former systems leave the power supply totally shutdown subsequent to their function. This presents an opportunity for an undesirable interruption of service which cannot be accepted in important and widespread areas. Such an area would be in the process area. For example, in the electroplating filed, such an interruption can cause damage to the objects being plated. In the chemical field, such interruption of current to an electrolytic chlorine cell would result in a serious explosion hazard.

SCR switches and circuit breakers have also been used for overcurrent protection. However, they likewise have the disadvantage discussed above in that they completely turn the circuit off, requiring a manual step to restore normal current flow. Moreover, commonly employed circuits protecting against external faults operate to trip the main circuit breakers by placing an overload on the circuits on the line side of the power supply system. This is a rough and ready means of control which is not free from the danger of damage to the SCR's. An example of this type of system is the crowbar circuit, which is usually connected across the secondary windings of the power supply transformer.

However, with the system of the present invention, rapid protection is given to the SCR's in the event the current rises beyond a predetermined value, but before it reaches a damaging level, by rapidly phasing them back to their nonconductive stage within a period of not more than one-half of one cycle, and then turning on the current flow on a relatively gradual basis compared with the phase-back speed. This slow turn-on permits supplementing control systems of slower response to take over control of the current flow in the system. Such supplementary control circuits may include a phase-control system employing a trigger circuit to fire the SCR's at a varying conduction angle thereby limiting current flow to the load and providing protection against external faults without shutting down current flow completely. The supplementary control system may also protect against internal faults by disconnecting the system from the supply after a delay in time, without ever permitting the current level to reach the point, and continue for the time, required to trip the main circuit breaker in response to an overload condition.

Accordingly, it is one object of the present invention to provide an improved control system protecting the SCR's and associated components, including diodes, in a power supply system against internal and external faults.

It is a further object of the present invention to provide a protective system for a power supply system controlled by SCR's which does not permanently disconnect the system from its source of power whenever an overload condition is sensed.

It is still a further object of the present invention to provide an overload protective system which does not require a manual operation to restore the current flowing into a power supply system after the control system acts to limit current peaks to a tolerable level.

It is another object of the present invention to provide a system protecting against excessive current which does not depend on a component requiring replacement, such as a current limiting fuse.

It is still another object of the present invention to provide a protective system in a power supply controlled by SCR's which does not place an overload on the line side in order to operate a control system disconnecting the power supply system from the alternating current source in the event of a fault in the direct current side, such as an electronic crowbar.

It is yet another object of the present invention to provide a protective system for a power supply controlled by SCR's which will disconnect the system from the power supply without subjecting the SCR's and associated components to the thermal and magnetic stresses of an overload condition of a level and duration required to trip the main circuit breakers.

It is again an object of the present invention to rapidly switch off the flow of current into a rectifier power supply system controlled by SCR's in the event the current therein rises to an excessive level before the current rises to a level damaging SCR's, diodes or associated equipment, and thereafter slowly restoring current flow into the system.

It is still a further object of the present invention to provide such an overload protection system in which rapidly operating control means cooperates with supplementary control means of slower response to control both internal and external faults.

It is still a further object of the present invention to provide a protective system providing very rapid response to damaging surges during which the current into the system would quickly rise to a excessive level before supplementary control means of relatively slow response can act control flow within the power supply system.

It is still a further object of the present invention to provide a protective system in which current flow is gradually restored to a threshold at which the supplementary control systems will exercise a control function but below the level at which the current is switched off. It is still another object of the present invention to provide a protective system which disconnects the power supply system from the power source after a predetermined period of time in the event of a damaging overload due to external faults while controlling the flow current into the power supply system at a tolerable level during such time period.

It is still another object of the present invention to greatly increase the reliability of such a control system by providing a backup capability to the supplemental control means by controlling current flow into the system in overload conditions by repeated cycling of a rapid switching means in the event said supplementary control means should fail to operate.

Other objects features, and advantages of the present invention will become readily apparent upon a consideration of the following description, the appended claims, and the drawings in which:

Figure 1:
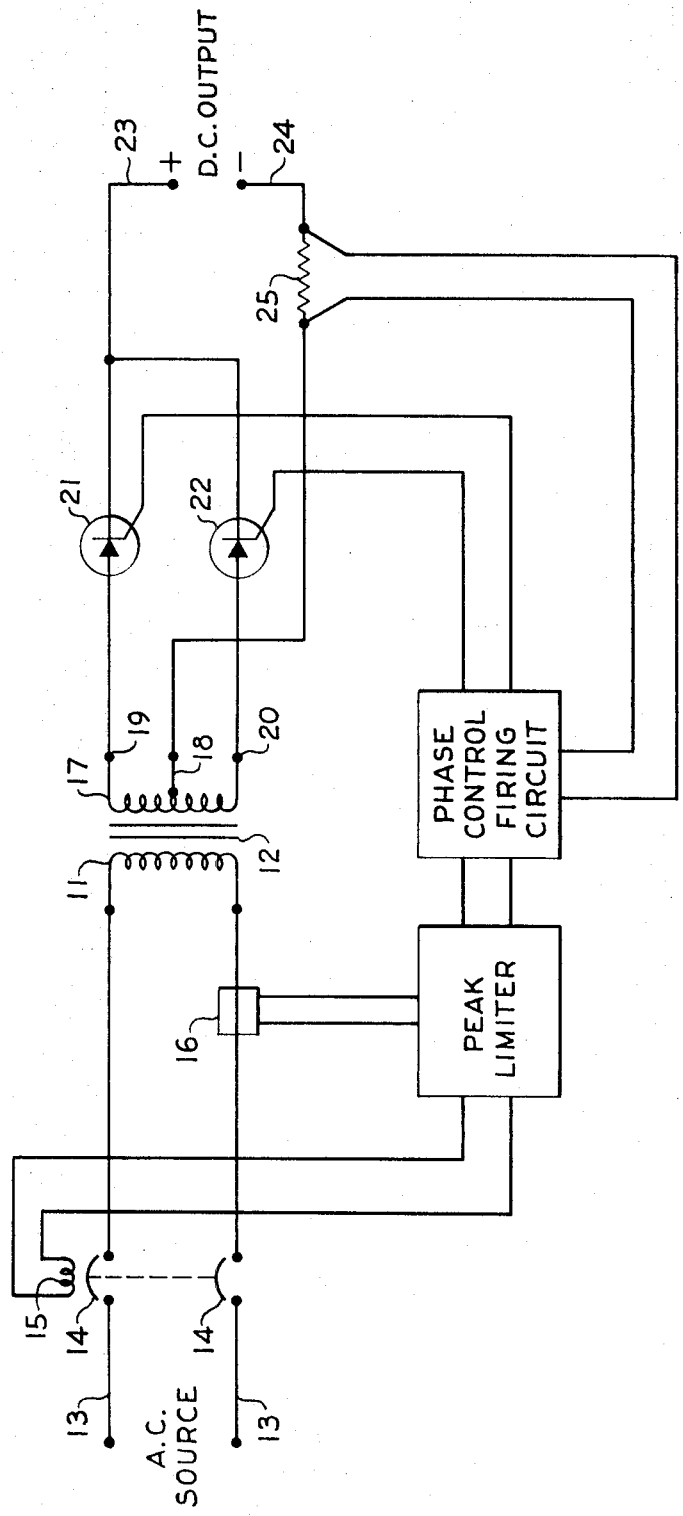
FIG. 1 is a simplified schematic to illustrate the principle of the invention.

In order to explain the invention, reference is now made to FIG. 1 of the drawings. A single-phase alternating current source is connected to the primary 11 of transformer 12 by the alternating current lines 13. Connected in the alternating current lines at their entrance to the power supply system and prior to the connection to the lines of any other circuit element are circuit breakers 14. The current flowing through the alternating current line is sensed by a current sensing transformer 16. The secondary winding 17 of transformer 12 is constructed with a center tap 18, centrally located with respect to the output terminals of the transformer 19 and 20 respectively. Secondary terminal 19 is connected to the anode of SCR 21 and secondary terminal 20 is connected to the anode SCR 22. The cathodes of SCR 21 and SCR 22 are connected together. Center tap 18 is connected to the load by direct current bus 24, forming the negative side of the circuit, and the connection point of SCR's 21 and 22 is connected to the load by direct current bus 23 forming the positive side. The gate leads of SCR's 21 and 22 are connected to the firing circuit, which produces on command a trigger signal phasing SCR's 21 and 22 to the conductive mode. Full wave rectification takes place when the SCR's are conductive and a direct current is delivered to the load. Working conditions are controlled by a phase controlled firing circuit to control the current out of the power supply system by varying the conduction angle of the SCR's. Such firing circuits are well-known and can be selected from a wide variety of types such as magnetic firing and unijunction transistor firing. Packaged firing circuits are available from a number of commercial sources in half and full wave design, single-phase or three-phase, for 60 c.p.s. or 400 c.p.s. An appropriate circuit will be responsive to at least one command signal controlling its operation. A suitable circuit is the copending application of James Galloway, Ser. No. 878,487 filed Nov. 20, 1969, entitled, "Feedback System." Current flow on the alternating current lines 13 is sensed by current transformer 16, which are connected to a peak limiting circuit. The peak limiting circuit includes an input section which receives an input from the current sensing transformers, and produces a signal representing the current flow in alternating current lines 13 and 14. This current flow signal is fed to a comparator section which compares the current flow signal with another signal representing the maximum current value desired to flow into the system. In the event that the sensed current signal exceeds the reference signal, an error signal is generated which is fed to an input circuit of the phase control firing circuit, rapidly rephasing SCR's 21 and 22 to their nonconductive mode, thereby preventing the current flowing into the system from exceeding the predetermined safe value. In view of the fact an alternating current is being switched, turnoff time will not exceed one-half of one cycle. After turnoff, a signal is generated which is fed to an input circuit of the phase control firing circuit rephasing current flow on a relatively slow gradual basis. Current flow into the external circuitry is sensed by current sensing resistor 25, which is connected to the phase control firing circuit.

In the case of an internal fault, overcurrent protective means incroporated in the phase controlled firing circuit is actuated when the voltage across current sensing resistor 25 exceeds a threshold value corresponding to normal rate current and operates to initiate conduction in the SCR's 21 and 22 at a firing angle which will limit the current flow into the system to normal rated flow. The peak limiter will no longer act to control the current, as controlled flow will be controlled at a level below the threshold of the peak limiter. Such overcurrent means will operate in this manner without entirely shutting down the system until the external fault, such as a piece of metal on the load bus work, is cleared. Thereafter, normal operation will be resumed. In the event that an internal fault occurs, such as a failed diode, a transformer fault or a piece of metal falling across the internal bus work, current will no longer flow in the external bus work 23 and 24 and the overcurrent protective means incorporated in the firing circuit cannot take control. In such an event, the peak limiter will operate to control the current into the system. Current flow will continue to rise, as it is restored, until the threshold of the peak limiter is reached. At this point, the peak limiter will operate as previously described, rapidly switching the SCR's 21 and 22 off and gradually turning them on. The peak limiter will operate to control current input through a predetermined number of cycles comprising a desired time delay constant. During this period of time the current is not completely shutdown. If recovery from the fault does not occur during this time period, an error signal will be generated by the peak limiter circuit which is applied to the circuit breaker trip coils 15 causing the circuit breaker 14 to open the main alternating current supply lines 13.

Figure 2:
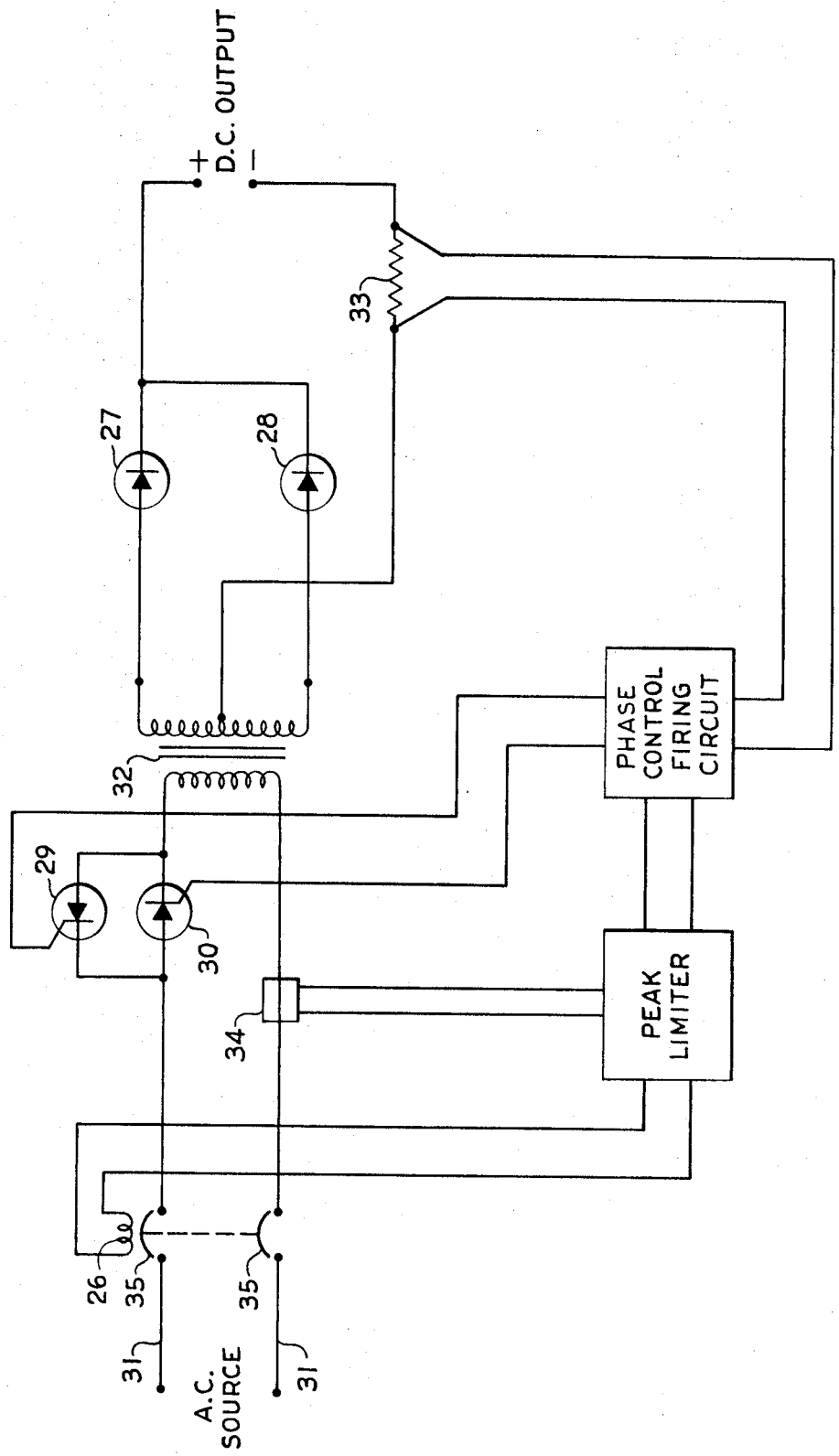
FIG. 2 is a simplified schematic of an embodiment of the invention employing SCR's as a control element in the line side of a power supply system.

To further develop the aforenoted into a more practical device, SCR's 21 and 22 are replaced by diode rectifiers 27 and 28 to perform the rectifier function in the power supply system, as illustrated in FIG. 2. SCR's 29 and 30 are connected in inverse parallel, or "back-to-back" in one of the alternating current line 31 feeding the transformer 32, as protective devices. This circuit has a number of advantages. For example, far improved protection can be given against internal faults. Likewise, in industrial process applications, where there is very frequently a low voltage high current output, the SCR's may be located in the input circuit where the current is lower, thereby optimizing the problem of employing SCR's in high current circuits with consequent economic advantages. The SCR's are controlled by a firing circuit as previously described and explained. The current sensing resistor 33 provides an input voltage to the firing circuit, which operates to control external faults as previously described. Current transformer 34, circuit breaker 35 and peak limiter all function as likewise described and explained.

Figure 3:
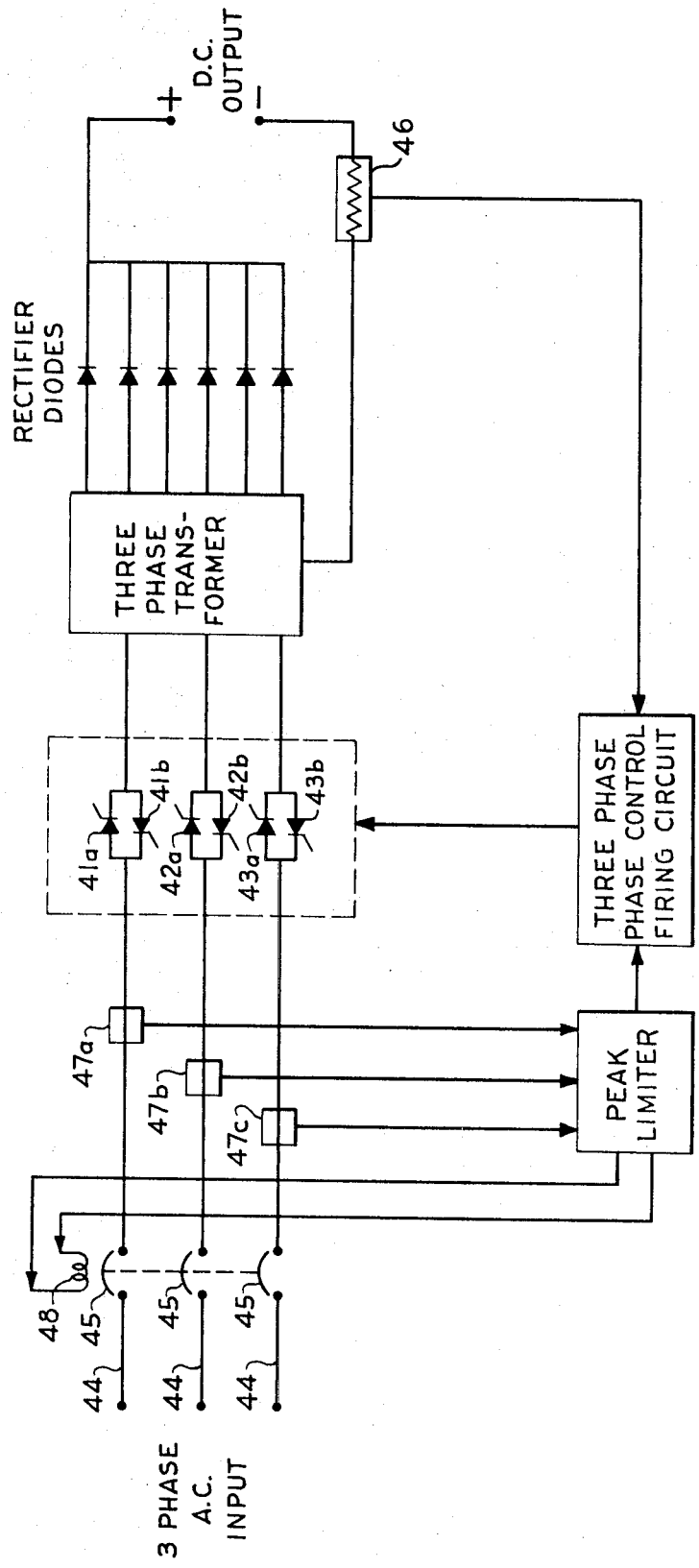
FIG. 3 is a simplified schematic diagram of a three-phase input embodiment of the invention.

To extend the aforenoted to a three-phase alternating current system, it is necessary to provide a three-phase alternating current input and a three-phase transformer as is illustrated in FIG. 3, which is a signal flow block diagram graphically showing the general principles of operation of such a circuit arrangement. A three-phase alternating current input is connected to three pairs of parallel inverse connected SCR's 41a and 41b, 42a and 42b and 43a and 43b by alternating current lines 44, which SCR's are in turn connected to a three-phase transformer. These are various configurations of three-phase transformers which may be used that are well known to those skilled in the art. For an example of such a transformer circuit, one may refer to Page 107 of Schaefer, "Rectifier Circuits-Theory and Design," Wiley, 1965. The illustrated embodiment contemplates the use of a transformer with a delta primary and double star secondary connections. As a result, six diode rectifiers are shown, one for each branch of the double star connection. Current flow through a current sensing resistor 46 provides a voltage signal to the three-phase phase control firing circuit, which in turn controls the SCR's, as previously described. Current into the system is sensed by current transformers 47a, 47b, and 47c which provide a signal to the peak limiter, which in turn provides a signal to the firing circuit and to the tripping coils 48 of circuit breaker 45, as previously described.

Figure 4:
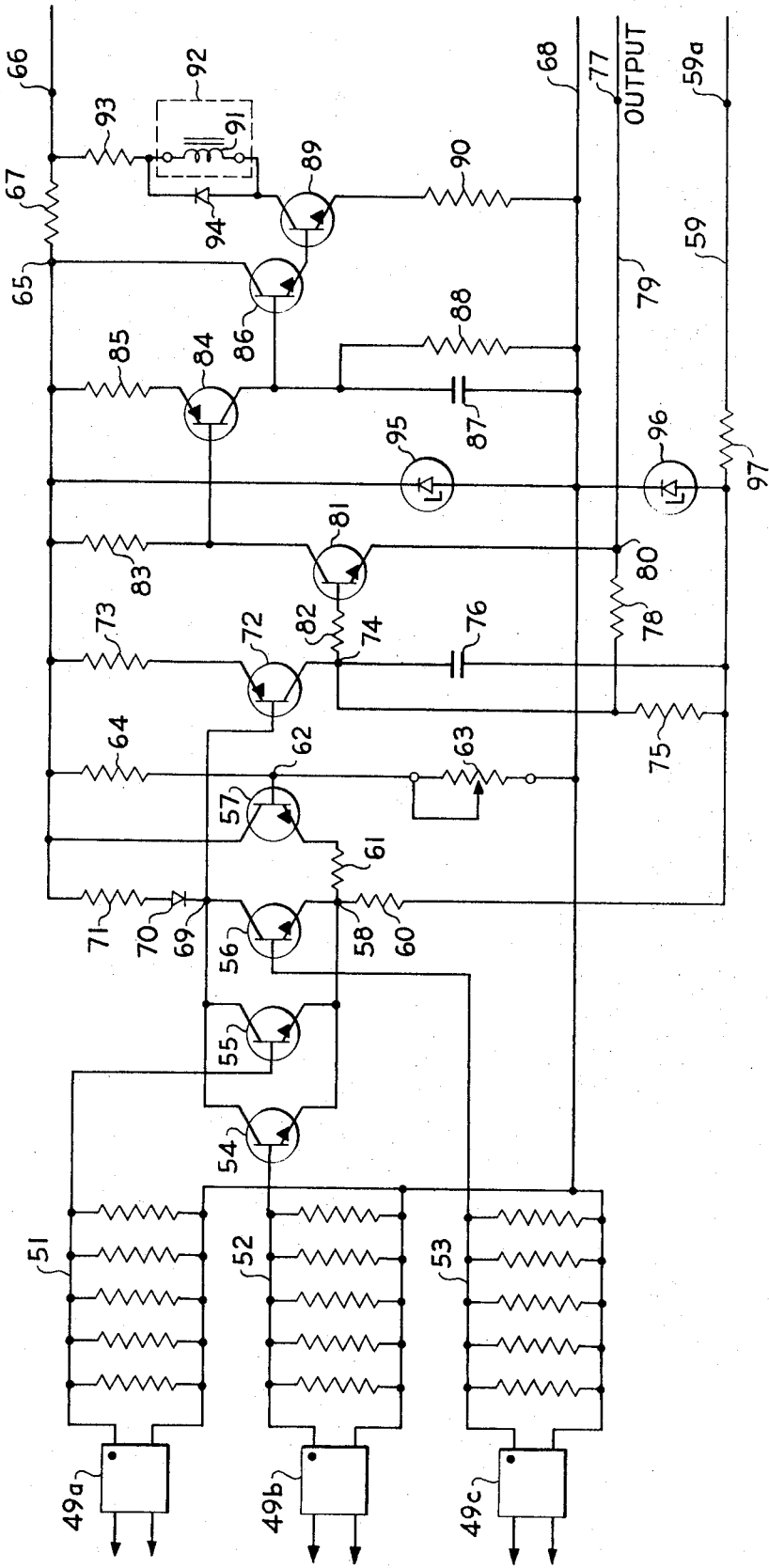
FIG. 4 is a schematic diagram of illustrating a preferred form of peak limiter circuit incorporating certain features of the claimed invention.

Reference is now made to FIG. 4 which illustrates the circuit details of an embodiment of a peak limiter circuit operating as aforesaid. For simplification, only a three-phase sensing system adapted to be used in the power supply configuration shown in FIG. 4 is illustrated, Inputs from current transformers 47a, 47b and 47c of FIG. 3 are connected to semiconductor diode bridges 49a, 49b and 49c. Such circuit components are standard parts available on the open market. The output of bridges 49a, 49b and 49c are connected to parallel resistor networks 51, 52 and 53 which form burden resistances for the current transformers. One side of each burden resistor network is connected to a common negative 68. The other side of networks 51, 52 and 53 are connected to the bases of NPN junction transistors 54, 55 and 56 respectively. Transistors 54, 55 and 56 are connected so that each acts as a differential comparator with NPN junction transistor 57. Logically, transistors 54, 55 and 56 are connected in an "or" configuration. The emitters of 54, 55 and 56 are connected in parallel to node 58 which is fed a negative direct current potential on input conductor 59 connected to negative supply terminal 59a through resistor 60. Resistor 60 serves as a common emitter resistor for the differential comparator, acting as a current source therefor. The emitter of NPN junction transistor 57 is connected to node 58 through resistor 61, which limits the gain of the differential comparator to provide stable operation. The base of transistor 57 is fed to a node 62 between potentiometer 63 and resistor 64. Resistor 64 is connected to a positive direct current voltage source node 65 fed from a positive voltage supply terminal 66 through dropping resistor 67 reducing the potential to the desired voltage, and potentiometer 63 is connected to common negative conductor 68. Potentiometer 63 and resistor 64 form a variable voltage divider network, providing a variable reference voltage to the base of transistor 57 which is connected to node 62. The collectors of transistors 54, 55 and 56 are connected in parallel to node 69. Node 69 is connected to the common positive source 65 through diode 70 and resistor 71, and the collector of transistor 57 is connected to positive source 65. Diode 70 is employed to compensate for temperature variations. The base of transistor 72 is also connected to node 69, and its emitter is connected to positive source 65 through resistor 73. The collector of transistor 72 is connected to node 74. Resistor 75 and capacitor 76 are both connected in parallel between node 74 and negative potential conductor 59, forming an RC time constant network for which transistor 72 forms a current source to charge capacitor 76. Resistor 75 is also connected to the output terminal 77 through resistor 78. Resistor 78 is connected to output terminal 77 by output conductor 79 between node 80 and terminal 77, serving to hold the initial charge on capacitor 76 at a plateau. The base of transistor 81 is connected to node 73 through resistor 82 which is a current limiting resistor, acting only in case of component failure and performs no active circuit function. Transistor 81 is connected as an emitter follower, its emitter being connected to output conductor 79 at node 80 and its collector is connected to the positive voltages source 65 through resistance 83. The collector of transistor 81 is also connected to the base of transistor 84. The emitter of transistor 84 is connected to positive voltage source 65 through resistor 85, and its collector is connected to the base of transistor 86 and to the RC time constant network formed by capacitor 87 and resistor 88 which are connected in parallel to the common negative 68. Resistors 83 and 85, together with transistor 84 form a current source to charge capacitor 87. The collector of transistor 86 is connected to the positive voltage source 65. Its emitter is connected in cascade to the base of transistor 89, transistors 86 and 89 forming a cascade amplifier. The emitter of transistor 89 is connected to the common negative 68 through current limiting resistor 90, and its collector is connected to one end of the coil 91 of a relay 92, which then controls the flow of current into circuit breaker trip coils 48 of FIG. 3. The other end of coil 91 of relay 92 is connected to the positive voltage supply connection 66 through current limiting resistor 93. Resistors 90 and 93 serve to limit the current into coil 91. Diode 94 is connected in parallel with coil 91 and acts as a free wheeling diode protecting against transients.

Zener diode 95 is connected between the common negative 68 and the positive voltage supply source 65 to provide voltage regulation, and Zener diode 96 is connected between the common negative 68 and the relatively more negative potential conductor 59 for the same purpose, voltage dropping resistor 97 supplying the desired voltage. Such relatively more negative power supply is required by the low end of the differential comparator circuit previously described. For example, the positive supply voltage at source 66 could be +35 volts, the voltage level at the common negative would be zero volts, and the voltage level at negative supply terminal 59a would be −35 volts.

In operation, inputs from the current transformers 47a, 47b and 47c are connected to the semiconductor diode bridges 49a, 49b and 49c, the outputs of which are connected to burden networks 51, 52 and 53, as previously described. One side of each burden resistor is connected to a common negative 68. The other side of the burden resistors 51, 52 and 53 are connected to the bases of transistors 54, 55 and 56 respectively so as to supply a signal representative of the current into the rectifier system.

Transistors 54, 55 and 56 are connected so as to each act individually as a differential comparator in cooperation with transistor 57. The reference side of the comparator circuit is provided by the network of resistor 64 connected in series with potentiometer 63. Potentiometer 63 is adjusted to provide a reference voltage, to the base of transistor 57, which reference voltage is compared with the current signal in the above-described comparator circuit. Potentiometer 63 is set to provide a reference voltage slightly above normal current as seen on burden resistors 51, 52 and 53.

The input current signal is compared with the reference signal in the comparator circuit. When the peak current on any phase rises above the reference level, either transistor 54, 55 or 56 is turned on. Current is then drawn through resistance 71 and diode 70, creating a voltage drop across these components. This potential is applied to the base of transistor 72. Transistor 72 is turned on and acts as a current source, current through its collector rapidly charging capacitor 76 in the positive direction. The output signal of the peak limiter at the output terminal 77 is normally negative, becoming more negative as increasing output is commanded from the firing circuit. Thus in normal operation, when transistors 54, 55 and 56 are turned off, capacitor 76 is discharged by resistor 75, keeping the base of transistor 81 at a point more negative than the output signal. When capacitor 76 charges positive, transistor 81 acts as an emitter follower, pulling the negative voltage of the output signal towards zero potential thereby shutting off the trigger circuit within the firing circuit and phasing back the SCR's of FIG. 3 to their nonconducting mode.

As the overcurrent sensed subsides, as a result of the SCR's being turned off, transistor 72 is turned off and capacitor 76 discharges through resistor 75. The output signal becomes increasingly negative, as capacitor 76 becomes decreasingly positively charged, at a relatively slower rate than turnoff, which rate is determined by the values of the RC circuit formed by resistor 75 and capacitor 76. As a result, the command signal to the firing circuit automatically orders the trigger circuits to gradually come back on and rephase the SCR's to the conductive mode.

It should be noted that resistor 78 serves to place and maintain an initial charge on capacitor 76 just slightly above the normal operating output signal in order to effect fast switching operation and minimize the time at which the command signal to the firing circuit cuts off.

As the increasing current flows into the rectifier system, it will continue to rise until transistor 72 is again turned on thus limiting the peak line current to a specified level.

In the event automatic self-recovery, as aforesaid, cannot endure due to persistence of the fault causing the overcurrent and transistors 72 and 81 are kept cyclically turned on due to continued presence of overcurrent, the collector current of transistor 81 turns on a current source acts to charge capacitor 87 which forms an RC circuit with resistor 88, thereby providing a time delay constant. As capacitor 87 charges, the cascade amplifier circuit composed of transistors 86 and 89, connected in a modified Darlington connection, supplies an increasing emitter voltage thereby increasing the current through relay coil 91. The current through coil 91 increases until the pulling point is reached and relay 92 operates to provide an energizing signal to circuit breaker coils 48 of FIG. 3 causing breakers 45 to open.

If the overcurrent condition originally sensed is reduced during the time delay period before relay 92 is operated to a point below the threshold set by adjustment of potentiometer 63, as previously described, the transistors 72, 81 and 84 turn off. When these transistors turn off, capacitor 87 is permitted to discharge through resistor 88, preventing relay 92 from being operated. Normal rectifier system operation resumes.

Such overcurrent conditions may be reduced by the clearing of a temporary short circuit in the external bus work or by control of the current into the rectifier system being established by the normal operating current control system of the rectifier system within the phase controlled firing circuit. The time delay in the operation of relay 92 is a matter of designers choice, but it has been found that providing values of capacitor 87 and resistor 88 that result in a time delay of approximately 5 seconds produce satisfactory results.

From the foregoing, it is seen that a reliable rapid and self-recovering peak current limiting control system has been provided which has many uses in the art, including providing rapid protection to a rectifier system supplying current to an electrolytic circuit in particular as well as to industrial processes in general. It is to be understood that variations could occur in the design of the circuit illustrated in FIG. 4 while still keeping within the scope of the present invention.

While it will be apparent that the embodiments of the invention herein disclosed are well calculated to fulfill the objects of the invention, it will be appreciated that the invention is susceptible to modification, variation and change without departing from the proper scope on fair meaning of the subjoined claims.

We claim:

1. In a system protecting semiconductor controlled rectifiers against short circuit conditions in a rectifier electric power supply system having an alternating current input and a direct current output, the improvement comprising means to sense peak current on the incoming alternating current lines, an input circuit connected to said sensing means generating an error signal when said peak current exceeds a predetermined level, switching means responsive to said error signal rapidly switching said semiconductor controlled rectifiers to the nonconducting mode, control circuit means automatically restoring current flow through said rectifiers on a gradual basis and control means of relatively slow response controlling the flow of current with said system in accordance with a predetermined limit.

2. In a system for protecting semiconductor controlled rectifiers against short circuit conditions when employed to control the supply of alternating current into a rectifier power supply system, the improvement comprising means to sense peak current on the incoming alternating current lines, an input circuit connected to said sensing means generating an error signal when said peak current exceeds a predetermined level, switching means responsive to said error signal rapidly switching said semiconductor rectifiers to the nonconducting mode, self-recovering control circuit means automatically restoring current flow through said rectifiers on a gradual basis, and supplementary control means of relatively slower response controlling the flow of current within said power supply system.

3. The improvement of claim 2 wherein said semiconductor rectifiers are phased back to the nonconductive state with a time not in excess of one-half of one cycle of the incoming alternating current.

4. The improvement of claim 3 in which said switching means would repeatedly cycle to control the current into said system in event said supplementary control system should fail to function.

5. In a system for controlling the flow of alternating electric current into a rectifier power supply system by means of a plurality of semiconductor controlled rectifiers protected against short circuit conditions by an overload protective subsystem, the improvement comprising means for sensing the peak current flowing in the alternating current feed lines, input circuit means connected to said sensing means producing a signal corresponding to said current, reference circuit means producing a signal corresponding to a preselected peak alternating current flow level, comparator circuit means for comparing said current signal against said reference signal and generating an output error signal when said current signal exceeds said reference signal, switching circuit means rapidly phasing back said semiconductor controlled rectifiers to their nonconductive mode in response to said error signal, an active phase controlling subsystem for automatically rephasing said semiconductor rectifiers to their conductive mode as a gradually increasing rate of current flow, and supplementary control means in said power supply system responsive to said gradually increasing current to control said alternating current flow if said restored current flow should exceed a threshold limit preset within said supplementary control means.

6. The improvement of claim 5 wherein said supplementary control means has a relatively slow response to excessive current conditions compared to said other circuit elements and cannot respond to overload conditions with equal rapidity to said faster control means.

7. The improvement of claim 6 wherein said semicontrolled rectifiers are rephased to the nonconductive state in a period of time not in excess of one-half cycle of said alternating current.

8. The improvement of claim 7 wherein said power supply system includes semiconductor rectifiers connected in the alternating current feed lines supplying said power supply system.

9. The improvement of claim 8 wherein said supplementary control system comprises two independent active subsystems, one of said subsystems being connected in said system to sense and control excessive current conditions caused by internal faults within said power supply system and the other being connected to sense and control excessive current conditions caused by external faults.

10. The improvement of claim 9 wherein the said gradually rephased current is increased to a level above normal but below damaging excessive current.

11. The improvement of claim 10 wherein said external fault sensing circuit will respond to a current level slightly in excess of normal caused by an external fault and automatically limit the current in the primary circuit of said transformer below an excessive current level and control normal rated current into said system, thereby overriding said rapid switching system.

12. The improvement of claim 11 wherein said external fault sensing system is connected in said supply system externally of said rectifiers.

13. The improvement of claim 12 wherein said internal fault control system comprises a plurality of electrically trippable circuit breakers, an actuating circuit connected to said circuit breakers to trip said circuit breakers in response to a command signal and circuit means to generate a command signal when excessive current conditions due to an internal fault is sensed.

14. The improvement of claim 13 in which said circuit means generating said command signal supplies said command signal after an interval of time comprising a preselected number of switching cycles of said switching circuit means.

15. In a system protecting the components of a solid state rectifier power supply against both internal and external faults in which current into said system is controlled by semiconductor controlled rectifiers controlled by a phase control system including overcurrent protection means, the improvement comprising a self-recovering peak limiting circuit overriding said phase control circuit to rapidly phase back said SCR's to their nonconductive state and then automatically restoring said current flow at a relatively slow rate until a threshold is reached at which said overcurrent protection means will operate to limit the flow of current into an external fault to normal rate current and disconnect said power supply system from its input power source after a predetermined delay, but before excessive current damages the circuit components, in the case of an internal short.

16. The improvement of claim 15 wherein said circuit comprises an input section generating a signal reflecting current flow into said power supply system, a reference section generating a reference signal reflecting a predetermined maximum current level, a comparator section comparing said signals and generating an error signal when said input signal exceeds said reference signals, and output circuit means responsive to said error signal to limit current flow within said power supply system to a predetermined safe value.

17. In the method of controlling the flow of alternating current within a rectifier power supply system of a plurality of semiconductor controlled rectifiers protected against short circuit conditions by an overload protective system, the improvement comprising the steps of sensing the peak current on the incoming alternating current feed lines, generating an error signal when said current exceeds a predetermined value, rapidly phasing back said semiconductors to their nonconductive mode in response to said error signal, automatically gradually restoring current flow through said rectifiers, and controlling the flow of restored current through said system by supplementary control means of relatively slow response.

18. The method of claim 17 wherein said semiconductor rectifiers are phased back to the nonconductive state within a time not in excess of one-half of one cycle of the incoming alternating current.

19. The method of claim 18 including the step of controlling said restored current flow by more than one active subsystems, one of which subsystems being connected in said system to sense and control excessive current conditions caused by external faults and another of said subsystems being connected in said system to sense and control excessive current conditions caused by external faults.

20. The method of claim 19 including the step of controlling said restored current when said restored current exceeds a normal current level but before it reaches an excessive damaging level.